W. Smith.
Weaving Colored Fabric.

No. 2,656. Reissued Jun. 18, 1867.

Witnesses:
Lewis W. Serrell
Chas Serrell

Inventor:
Wm Smith

N. PETERS, PHOTO-LITHOGRAPHER, WASHINGTON, D. C.

United States Patent Office.

WILLIAM SMITH, OF NEW YORK, N. Y.

*Letters Patent No.* 9,653, *dated April* 5, 1853; *extended seven years; reissue No.* 2,656, *dated June* 18, 1867.

IMPROVEMENT IN WEAVING CORDED FABRICS.

The Schedule referred to in these Letters Patent and making part of the same.

TO ALL TO WHOM THESE PRESENTS MAY COME:

Be it known that I, WILLIAM SMITH, of the city, county, and State of New York, weaver, have invented, made, and applied to use certain new and useful Improvements in Weaving; and I do hereby declare that the following is a full, clear, and exact description of the same, reference being had to the annexed drawing making part of this specification, wherein—

The like marks designate the same parts.

The object of my invention is to furnish means for weaving fabrics formed by a centre warp of India rubber for corrugated elastic goods, or any similar warp which is enclosed by a fabric formed on each side of it.

The nature of my said invention consists in weaving elastic and other fabrics with a stationary warp, enclosed in a fabric woven on each side of such stationary warp and forming the surfaces of the material.

*a* is the frame of the loom, of any convenient form, carrying the driving-shaft *b*, that is moved by any competent power. *c* are the connecting-rods from cranks on the shaft *b* to the lay *d* that is supported by and vibrates on a rock-shaft, 1. 2 is a warp-roller, kept from turning freely by the friction of a strap or any usual means, so that the warp 3 is given off when at the required tension as now practised. The warp 3 is to be of India-rubber strips if the fabric is to be corrugated and elastic, or this warp may be cotton, or any fibrous substance, where a thick quality of goods is required. This warp passes through the stationary heddle 4, and through the reeds *e* in the lay, over the breast-beam *f*, the fabric as it is formed being wound by any usual means on to the roller *g*. 5 is the warp-roller, supplying the warp 6 for the two sheds. The warp passes through heddles 7 and 8, and through the reeds *e*, forming the fabric with the warp 3 and filling, as hereafter shown. The heddles 7 and 8 are worked by any competent means, the one being fitted to ascend as the other descends.

Figure 1:
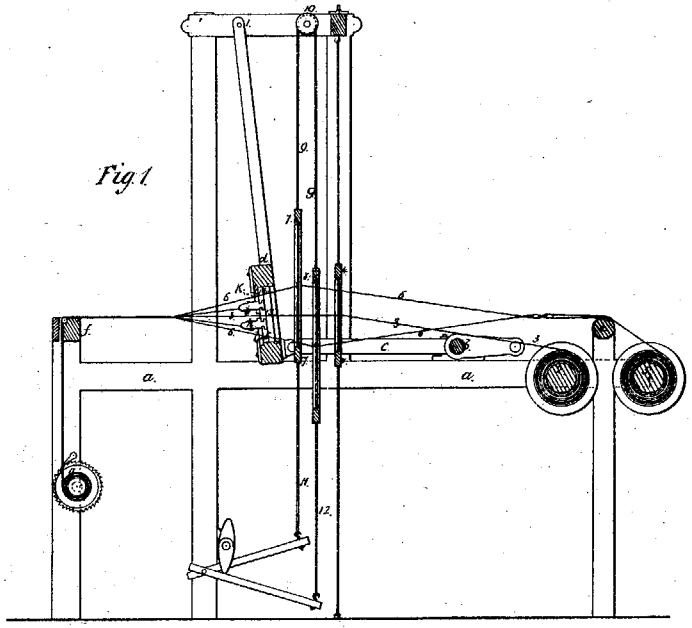
Figure 1 is a sectional elevation of the loom.
Figure 2:
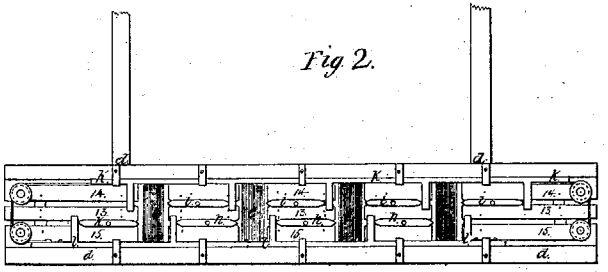
Figure 2 is a front view of the lay.

In the drawing these are shown as connected by straps 9 over a pulley, 10, the straps 11 and 12 being connected from the under side to treadle to be worked by cams from an auxiliary shaft, or by the feet in the usual manner when power is not used. The lay itself in front of the reeds *e* is shown as formed to receive two shuttles, having a centre piece, 13, with a rib on each edge, an upper piece, 14, and a lower piece, 15, all attached to the body of the lay so as to receive and sustain the shuttles *h* and *i*, by the ribs taking grooves in the top and bottom of the back edge of the shuttle, and the length of the shuttle being greater than the width of the reeds, one end enters the groove before the opposite end is disengaged. The shuttles are propelled by means of a frame, *k*, with projections depending from the same to give the blow and propulsion to the upper shuttle, and the lower shuttle is moved by a similar frame, *l*, and projections. Fig. 1 shows a means by which these frames may be moved, the ends of the top and bottom parts being connected by straps over pulleys, so that one travels one way while the other travels in the opposite direction, and by an ordinary picking motion if in a power-loom, or the usual strap for a hand-loom applied to move either frame, the shuttles are thrown in opposite directions through the sheds above and below the warp 3.

Figure 3:
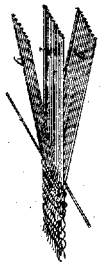
Figure 3 is a perspective view illustrating the mode of weaving the fabric that is formed by this loom.

This loom is especially intended for use in weaving corrugated elastic fabrics, several pieces being woven at the same time. I wish it to be distinctly understood that I do not limit myself to the means for moving the shuttles, as instead of the frames *k* and *l* racks may be used, that in their motion rotate pinion-wheels fixed on the lay that take a rack in the side of each shuttle, one pinion taking hold of one end of the shuttle before it clears the other pinion, thus drawing the shuttle through the shed even if the motion be not sudden enough to throw the shuttle; or both shuttles may be thrown through the sheds in the same direction at the same time. The two shuttles carry bobbins with filling as usual, and the loom in working forms a fabric, as shown in larger size in fig. 3, the warps 6 passing up and down through the stationary centre warp 3. The filling from the upper shuttle *i* forms a fabric on one side of the warp 3, while the filling from the lower shuttle *h* forms a fabric on the under side; thus the warp 3 is enclosed. And in weaving India-rubber elastic goods, my loom and mode of weaving are especially useful, and have advantages over other looms for the following reasons, which reasons apply to a certain extent to the weaving of other fabrics than India rubber.

First, when a warp of India rubber has been enclosed in a woven fabric it has been done by one shuttle passing over and depositing its filling, the rubber then being raised and the shuttle passing beneath it. In this mode of weaving the fabric has ribs produced on its surface, caused by the India rubber, in raising or lowering, imbedding itself in the filling or woof, leaving the India-rubber thread loose within its covering which is raised on each side; but by my arrangement the India rubber being stationary, but a slight rib is formed on the surface of the goods, and the rubber is held tightly, and is not so liable to draw into the fabric at its ends when said fabric is cut crosswise of the rubber.

Second, where two shuttles have been used with different or the same kinds of filling, one has passed through the shed, and then the India rubber raised up to let the second shuttle pass beneath it; this produces the same imperfections in the goods that are manufactured.

Third, with both the foregoing old methods for weaving elastic goods, the India rubber being moved against the surfaces and edges of the reeds is subject to constant wear and friction, often breaking the India-rubber warp, whereas in my loom the rubber being stationary is not subject to so much wear.

Fourth, by using two shuttles, as herein shown, a saving of time is effected, because under the old methods first one side was formed and then the other of the fabric, my method requiring but about half the time, thereby producing a corresponding saving in cost.

Fifth, where but one shuttle is used in weaving elastic fabrics an expense is incurred which can be saved by my loom, as these fabrics are usually formed entirely with silk, while in mine I can use silk from one shuttle to form the side which is seen, while a filling of cotton or similar fabric from the other shuttle may form the under side, thereby saving much cost for material.

I do not claim two shuttles, as two or more have been used in various kinds of weaving; but what I claim, and desire to secure by Letters Patent, is—

The process herein specified of weaving, consisting in the use of stationary warps, in combination with moving warps and filling that form a fabric on each side of such stationary warps, substantially as set forth.

Dated this twentieth day of April, A. D. 1867.

WILLIAM SMITH.

Witnesses:

CHAS. H. SMITH,

GEO. D. WALKER.